US011235720B2

(12) United States Patent
Höning et al.

(10) Patent No.: US 11,235,720 B2
(45) Date of Patent: Feb. 1, 2022

(54) BUMPER CROSSMEMBER

(71) Applicant: Kirchhoff Automotive Deutschland GmbH, Attendorn (DE)

(72) Inventors: Joachim Höning, Iserlohn (DE); Ulrich Wittkugel, Hemer (DE); Stephan Lagin, Attendorn (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 16 days.

(21) Appl. No.: 16/651,009

(22) PCT Filed: Oct. 2, 2018

(86) PCT No.: PCT/EP2018/076848
§ 371 (c)(1),
(2) Date: Mar. 26, 2020

(87) PCT Pub. No.: WO2019/072653
PCT Pub. Date: Apr. 18, 2019

(65) Prior Publication Data
US 2020/0317149 A1    Oct. 8, 2020

(30) Foreign Application Priority Data
Oct. 9, 2017    (DE) .......................... 102017123325.3

(51) Int. Cl.
*B60R 19/04*      (2006.01)
*B60R 19/18*      (2006.01)

(52) U.S. Cl.
CPC .............. *B60R 19/04* (2013.01); *B60R 19/18* (2013.01); *B60R 2019/1813* (2013.01)

(58) Field of Classification Search
CPC .. B60R 19/04; B60R 19/18; B60R 2019/1813
See application file for complete search history.

(56) References Cited

U.S. PATENT DOCUMENTS 8,950,794 B2    2/2015 Lenkenhoff
9,446,799 B2    9/2016 Franzpötter
(Continued)

FOREIGN PATENT DOCUMENTS

JP    H06-328988 A    11/1994
JP    2011235718 A    11/2011
(Continued)

OTHER PUBLICATIONS

U.S. Appl. No. 16/637,135, filed Feb. 6, 2020 (Töller), applicant Kirchhoff Automotive Deutschland GmbH. Per USPTO waiver of Rule 1.98(a)(2)(iii) requirement.
(Continued)

*Primary Examiner* — D Glenn Dayoan
*Assistant Examiner* — Melissa Ann Bonifazi
(74) *Attorney, Agent, or Firm* — Polson Intellectual Property Law, PC; Margaret Polson; Christopher Sylvain (57) ABSTRACT

A bumper crossbeam comprises a beam profile and a closing plate. The beam profile extends in its longitudinal axis in the vehicle transverse direction (y direction) and is open in the travel direction (x direction). The beam profile comprises an upper leg, a lower leg and a web connecting the legs, and thus providing a chamber. The closing plate is attached to the upper and lower legs. At least one reinforcing element or a reinforcing element assembly comprising such a reinforcing element is installed in the profile chamber, wherein the reinforcing element comprises, on each of its ends facing in the profile longitudinal direction, a leg angled in the direction toward the web of the beam profile and ending with spacing to the web.

18 Claims, 5 Drawing Sheets

(56) References Cited

U.S. PATENT DOCUMENTS

| | | |
|---|---|---|
| 9,598,100 B2 | 3/2017 | Lenkenhoff |
| 9,764,764 B2 | 9/2017 | Irle |
| 10,005,495 B2 | 6/2018 | Töller |
| 10,577,025 B2 | 3/2020 | Michler |
| 2015/0102614 A1 | 4/2015 | Arns |
| 2017/0136971 A1* | 5/2017 | Suzumori ............ B60R 19/023 |
| 2019/0185060 A1 | 6/2019 | Gündogan |
| 2019/0344385 A1 | 11/2019 | Töller |

FOREIGN PATENT DOCUMENTS

| | | |
|---|---|---|
| JP | 2014088125 A | 5/2014 |
| WO | 2016117335 A1 | 7/2016 |
| WO | 2016163054 A1 | 10/2016 |

OTHER PUBLICATIONS

U.S. Appl. No. 16/633,769, filed Jan. 24, 2020 (Günther), applicant Kirchhoff Automotive Deutschland GmbH. Per USPTO waiver of Rule 1.98(a)(2)(iii) requirement.
U.S. Appl. No. 16/636,623, filed Feb. 4, 2020 (Günther), applicant Kirchhoff Automotive Deutschland GmbH. Per USPTO waiver of Rule 1.98(a)(2)(iii) requirement.
International Search Report dated Dec. 20, 2018 in parent International application PCT/EP2018/076848.
Written Opinion of the International Searching Authority dated Dec. 20, 2018 in parent International application PCT/EP2018/076848.
Office Action dated Oct. 12, 2021 in related Japanese application No. 2020-520011.

* cited by examiner

BUMPER CROSSMEMBER

BACKGROUND

The present disclosure relates to a bumper crossbeam having a beam profile, which extends in its longitudinal axis in the vehicle transverse direction (y direction) and is open in the travel direction (x direction), comprises an upper leg, a lower leg, and a web connecting the legs and thus provides a chamber, and having a closing plate, which spans the profile opening in the vertical direction (z direction) and extends over at least a portion in the longitudinal extension thereof and is attached to the upper and lower legs.

Bumper crossbeams are arranged in motor vehicles on the front and/or rear. Bumper crossbeams comprise a beam profile, which is typically formed hat-shaped in its cross section and is fastened on the vehicle side. The profiling is formed by an upper leg, a lower leg, and a web connecting the two legs, which can also be referred to as the back of the profile. The beam profile is open in the travel direction and therefore typically has an open profile chamber which is typically profiled approximately U-shaped in cross section and is open in the travel direction. The web connecting the legs faces toward the vehicle. The beam profile is fastened on the vehicle side with crash boxes interposed. The two legs of the beam profile enclosing the profile chamber have angled flanges facing away from the profile chamber in the vertical direction (y direction) at the ends thereof. A closing plate for the frontal closing of the profile chamber is fastened thereon. The closing plate attached to the flanges of the legs of the beam profile is also used to reinforce the beam profile, since a box profile is provided in this way in the region of the closing plate. Such a design prevents the one or the other leg of the beam profile from being displaced in relation to the other leg in the event of an impact to be absorbed. In some designs, the closing plate extends over the entire or almost the entire longitudinal extension of the beam profile.

The rigidity of such a bumper crossbeam is substantially set by the depth of the profiling of the beam profile. The depth of a bumper crossbeam and thus its extension in the vehicle longitudinal direction (x direction) is generally restricted. This is to be taken into consideration in the dimensioning of the profile depth of the beam profile in conjunction with the design of the bumper crossbeam. In some cases, however, this is not sufficient to provide the bumper crossbeam with the desired rigidity. It has been proposed in WO 2016/163054 A1, to provide a remedy at this point, that a reinforcing element be installed in the profile chamber of the beam profile. This reinforcing element previously known from the prior art is an open or closed reinforcing element conceived as approximately trapezoidal in cross section, which is welded with the base of its shorter trapezoid side to the web of the beam profile connecting the legs. In a design in which the reinforcing element is designed as open, it has legs angled outward in the vertical direction, which are incorporated into the joint between the angled flanges of the legs of the beam profile and the closing plate. The equipment element is located in the middle in relation to the beam profile and extends over only a short portion in relation to the longitudinal extension of the beam profile.

Although an improvement of the crash behavior of the bumper crossbeam in the so-called pole test can be achieved by the installation of such an equipment element, disadvantages nonetheless have to be accepted. These relate, on the one hand, to the required welding of the reinforcing element to the web of the beam profile, which is not unproblematic in particular if the reinforcing element is closed and is thus formed as a hollow chamber profile, because of the lack of accessibility or accessibility only with extreme difficulty of the joining point. The components under discussion of such a bumper crossbeam are often manufactured from a steel plate. To equip these bumper crossbeams with the desired corrosion resistance, they are coated in the course of a cathodic dip coating. Because of the large contact surfaces between the reinforcing element and the beam profile, proper wetting of the entire surface and thus a coating of the above-mentioned type cannot be ensured.

SUMMARY

Proceeding from this background, an aspect of the present disclosure is based on refining a bumper crossbeam of the type mentioned at the outset in such a way that, above all, the installation of the reinforcing element into the beam profile of the bumper crossbeam is simplified. Moreover, the bumper crossbeam is to be suitable for a corrosion coating in the course of a cathodic dip coating.

This is achieved by a bumper crossbeam of the type mentioned at the outset, in which at least one reinforcing element or a reinforcing element assembly comprising such a reinforcing element is installed in the profile chamber, which reinforcing element has a long axis extending in the profile longitudinal extension and a short axis extending in the vertical direction, which is multiple times shorter than the long axis. If the reinforcing element is not part of a reinforcing element assembly, the reinforcing element is attached with its upper edge facing toward the profile opening to the upper leg of the beam profile and with its lower edge facing toward the profile opening to the lower leg of the beam profile, or if the reinforcing element is part of the reinforcing element assembly, the reinforcing element assembly is attached to the side of the closing plate facing toward the profile opening and extends into the profile chamber, wherein the reinforcing element comprises, on its ends facing in the profile longitudinal direction, legs each angled in the direction toward the web of the beam profile and ending with spacing to the web.

The direction specifications x direction, y direction, and z direction as used in the context of this disclosure are the directions typically used in this regard in vehicles. The x direction is the direction of the longitudinal extension of the vehicle, the y direction is the direction transverse thereto in the direction of the width of the vehicle. The z direction is the direction in the vertical.

The reinforcing element used in this bumper crossbeam is an elongated component, embodied like a bracket, the longitudinal extension of which follows the longitudinal extension of the beam profile. This reinforcing element is inserted into the profile chamber with its upper edge and its lower edge offset in relation to the terminus of the bumper crossbeam facing in the travel direction and fastened on the upper leg and the lower leg. Welding is suitable for this purpose for the attachment of the reinforcing element to the beam profile, wherein the weld seam does not necessarily have to be continuous, but rather can also be embodied as a stitched seam. The reinforcing element is located set back from the terminus of the beam profile facing in the travel direction, but is located in its vicinity. The reinforcing element has in each case a leg angled in relation to its longitudinal extension on each longitudinal end, wherein the legs typically enclose an angle with the bracket-shaped portion of the reinforcing element such that the legs face in the x direction. The ends of the legs end with spacing to the web of the beam profile. An installation of such a reinforcing element into the profile chamber of a bumper crossbeam is possible without problems, since the joint is readily accessible from the side of the profile opening of the beam profile. The reinforcement of the bumper crossbeam effectuated in this manner over the extension of the reinforcing element or reinforcing element assembly results in an improvement of the crash behavior, in particular in the so-called pole test.

It is advantageous that the reinforcing element is produced separately from the beam profile and the closing plate. The reinforcing of the bumper crossbeam effectuated by the reinforcing element can thus be enhanced in a simple manner by corresponding structuring thereof. An improvement of the reinforcing effect can be achieved, for example, in that the reinforcing element is profiled in the vertical direction. This may be achieved by a bead following the longitudinal extension of the reinforcing element and typically extending over the entire longitudinal extension.

These legs are unstructured if the back of the reinforcing element connecting the angled legs is structured in the vertical direction. The angled legs are typically used for an impact energy absorption like a crash element. In the event of an impact, they are pressed in the direction toward the web of the beam profile or, for the case in which the reinforcing element is part of a reinforcing element assembly, toward the further component of the reinforcing element assembly and, if they arrive in contact on the web or a base of a component associated with the reinforcing element assembly as a buttress, are deformed with absorption of energy. If desired, these angled legs of the reinforcing element can comprise energy absorption fold contact structures, such as beads extending in the vertical direction, in the case of such a use.

In one design, in which such a reinforcing element is part of a reinforcing element assembly, it is inserted into a reinforcing profile as a further component of the reinforcing element assembly. This reinforcing profile is also profiled in a U shape having its profile opening facing away from the vehicle with an upper leg, a lower leg, and a web connecting the legs. Although such a reinforcing profile can extend over the entire longitudinal extension in the y direction of the beam profile, it is generally considered to be sufficient if it spans the portion extending between the crash boxes attached to the beam profile. A shorter design of such a reinforcing profile is also entirely possible. The reinforcing element is joined, typically welded, with its upper and lower edge to the inner side of the upper leg or the lower leg, respectively. The reinforcing profile is inserted into the profile chamber of the beam profile, but does not contact the web of the beam profile connecting the two legs with its termination facing toward the vehicle. The cross-sectional profiling of the reinforcing profile can substantially correspond to the cross-sectional profiling of the beam profile. However, this is not absolutely required.

It is of particular interest that such a reinforcing element assembly is attached to the inner side of the closing plate. The fastening of a reinforcing element with respect to the beam profile and thus the bumper crossbeam on the inner side of the closing plate, typically by a weld, is noteworthy because, following the prevailing opinion, it was previously presumed that such reinforcing structural plates would have to be fastened on the beam profile itself. Because of the separate production of the beam profile with its profile chamber and the closing plate having the reinforcing element assembly attached thereon, these parts can readily be subjected to a dip coating, in particular a cathodic dip coating, without it being a concern that specific surface regions will be coated only inadequately or not at all. The approach in this concept is a different one from the approach selected in the prior art. While in previously known reinforcing concepts of beam profiles in bumper crossbeams, the beam profile has specifically been reinforced, since it is the component to be reinforced, such a reinforcing element assembly attached to the closing plate and protruding into the profile chamber does effectuate a certain reinforcement. However, it becomes particularly effective if the reinforcing profile comes into contact with the beam profile in the event of an impact. Reinforcing of the beam profile meeting the requirements thus occurs only or first when it is actually required, specifically in event of an impact.

It is also advantageous in such a design that not only the reinforcement in case of a pole test but also the torsional rigidity is enhanced by the reinforcing profile. It is also advantageous that depending on the vehicle or its design, a reinforcing element assembly adapted to the beam profile with respect to the respective requirements can be installed in the same beam profile. This relates to the design of the reinforcing profile with respect to its structuring and material thickness and also to the reinforcing element itself. With such a modular construction of bumper crossbeams, the same beam profile can thus be used with further components attached thereon, for example, the crash boxes for different vehicles, wherein the specific bumper crossbeam properties can be configured by corresponding selection of the reinforcing element assembly to be installed. This also applies to the closing plate. Differently designed reinforcing element assemblies can be attached on one such closing plate. This also applies to the reinforcing element, even if it is inserted directly into a beam profile.

In a further refinement, it is provided that the chamber formed by the beam profile typically has a constriction formed by a bead-like bulge of the lower leg of the beam profile in its middle region in relation to the longitudinal extension of the beam profile. Such a constriction reducing the height of the profile chamber represents a buckle contact, at which the beam profile buckles upward and thus in the z direction in the event of an impact, if a force having a vectorial component in the z direction is introduced due to an object acting on the bumper crossbeam. The location of such a buckle contact is defined by the constriction. It is typically located in the middle region of the beam profile. Such a design is advantageous if a reinforcing element assembly protrudes into the chamber of the beam profile. The reinforcing element assembly is typically arranged with spacing to the legs of the beam profile in such a design. In case of buckling of the beam profile in the z direction, the reinforcing element assembly is tilted in the chamber in relation to the beam profile. Both elements begin to work against one another, with the result that impact energy is absorbed. In this way, breaking of the beam profile is prevented in the case of the forces applied in the scope of the typical tests.

BRIEF DESCRIPTION OF THE DRAWINGS

The description below is provided on the basis of example embodiments with reference to the appended figures, wherein.

DETAILED DESCRIPTION

Figures 1, 2, 3, 4:
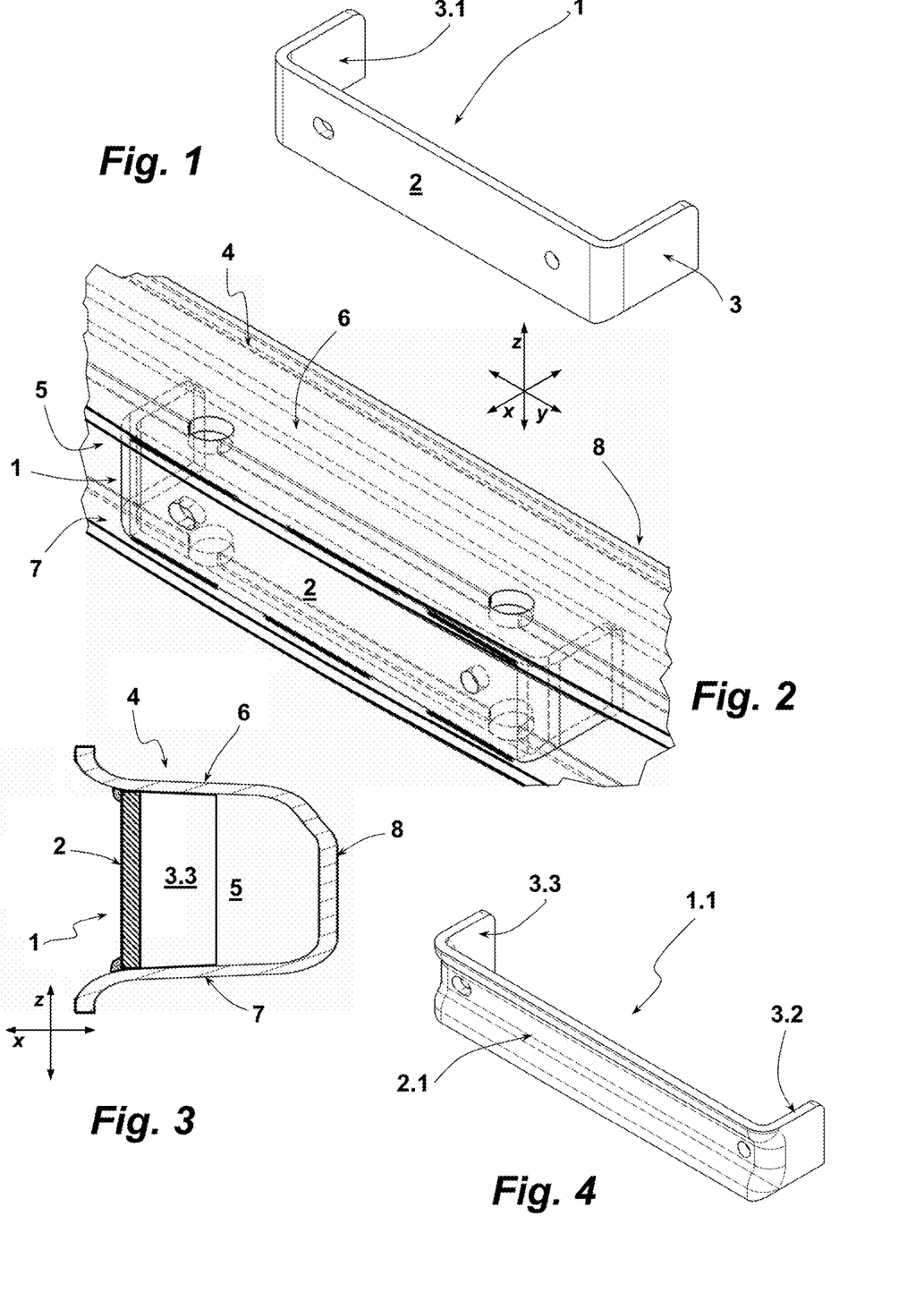
FIG. 1 shows a perspective view of a first design of a reinforcing element according to the present disclosure.
FIG. 2 shows the reinforcing element of FIG. 1 inserted into a beam profile of a bumper crossbeam.
FIG. 3 shows a cross-sectional view of the arrangement of FIG. 2.
FIG. 4 shows a perspective view of a reinforcing element, basically constructed like that of FIG. 1, according to a further refinement.

With reference to FIG. 1, a reinforcing element 1 is designed as an elongated element and comprises a bracket-like back 2, the longitudinal extension of which follows the longitudinal extension of a beam profile of a bumper crossbeam, when it is installed thereon. The long axis of the reinforcing element 1 extending in the profile longitudinal extension is multiple times longer than the short axis extending in the vertical direction. A leg 3, 3.1 is angled in each case on the ends of the back 2 facing in the longitudinal direction. The back 2 of the reinforcing element 1 is reinforced by the angling of the legs 3, 3.1. The legs 3, 3.1 extend in the x direction, specifically in the direction toward the vehicle.

FIG. 2 shows a perspective detail of a beam profile 4 as part of a bumper crossbeam (otherwise not shown in greater detail). The reinforcing element 1 is inserted in the profile chamber 5 of the beam profile 4. The beam profile 4 is shown so that the arrangement of the reinforcing element 1 in the profile chamber 5 is recognizable. The profile chamber 5 is enclosed by an upper leg 6 and a lower leg 7, which are connected to one another on the vehicle side by a web 8. The profiling of the beam profile 4 is thus approximately U-shaped. The upper edge of the back 2 of the reinforcing element 1 facing toward the profile opening is welded to the inner side of the upper leg 6 of the beam profile 4, and the lower edge of the back 2 of the reinforcing element 1 facing toward the profile opening is welded to the inner side of the lower leg 7 of the beam profile 4. The joining connection is embodied as a stitched seam, as seen in FIG. 2. The arrangement of the reinforcing element 1 in the profile chamber 5 of the beam profile 4 is shown in a cross section in FIG. 3. The back 2 of the reinforcing element 1 is arranged offset from the profile opening in the direction toward the web 8. To complete the bumper crossbeam, the front profile chamber opening is closed using a closing plate (not shown).

FIG. 4 shows a further reinforcing element 1.1, which is constructed in principle like the reinforcing element 1 of FIGS. 1 to 3. The previous statements in this regard thus apply similarly to the reinforcing element 1.1. The reinforcing element 1.1 differs with respect to the design of its back 2.1 from the design of the back 2 of the reinforcing element 1. The back 2.1 is profiled in the vertical direction and thus in the z direction to reinforce it. In the illustrated embodiment, the profiling is embodied as a bead extending over the longitudinal extension of the back 2.1. The profiling does not continue in the angled legs 3.2, 3.3, since these are not additionally to be reinforced in the x direction. This would negatively affect an energy absorption by deformation in the illustrated embodiment.

Figure 5:
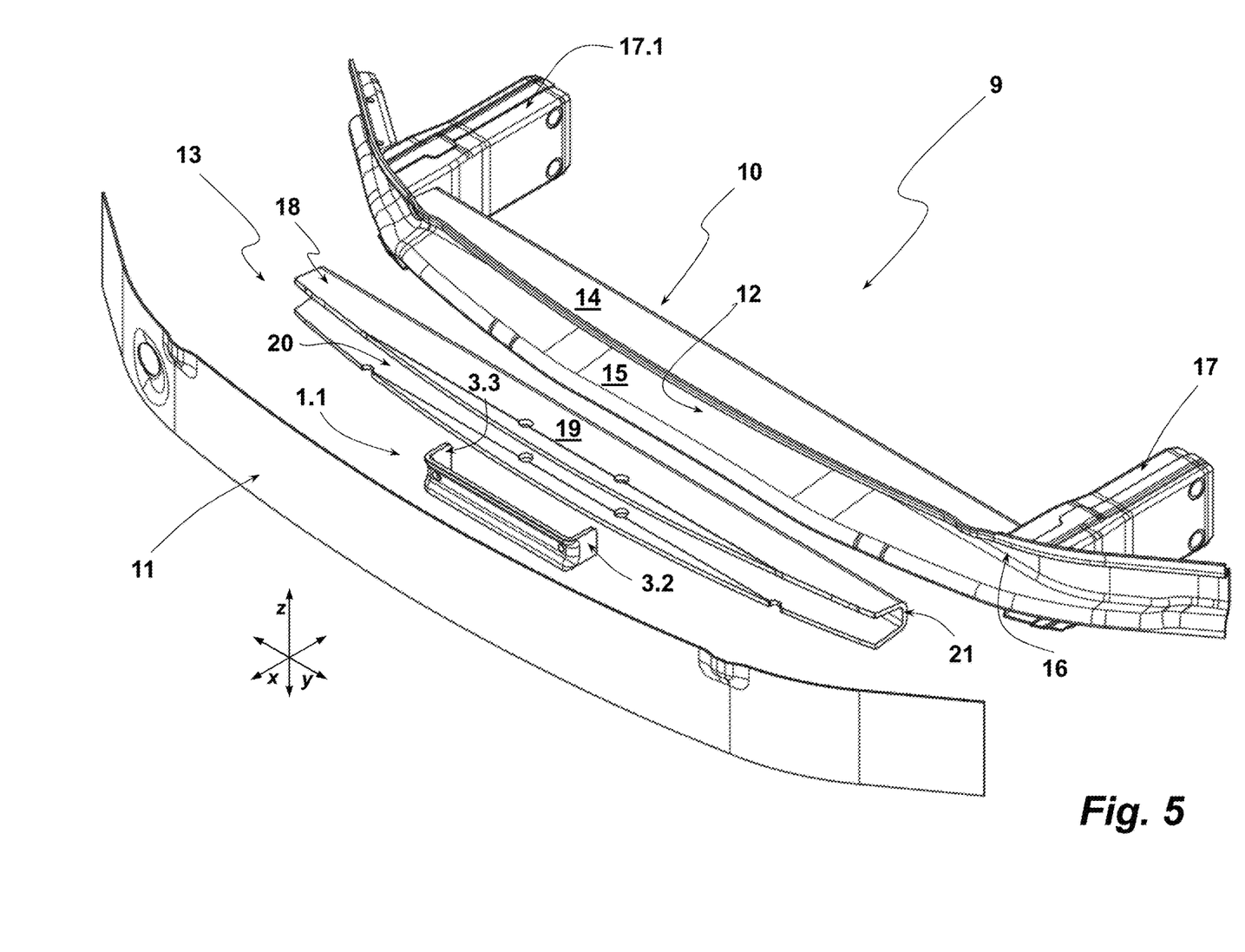
FIG. 5 shows a perspective exploded view of a bumper crossbeam having a reinforcing element assembly according to the present disclosure.

FIG. 5 shows a bumper crossbeam 9 having its beam profile 10, a closing plate 11 closing this profile on the front side, and a reinforcing element assembly 13 protruding into the profile chamber 12 of the beam profile 10. The beam profile 10 has, like the beam profile 4, an upper leg 14, a lower leg 15, and a web 16 connecting the legs 14, 15 on the rear. The web 16 faces in the vehicle direction. Two crash boxes 17, 17.1 are attached to the beam profile 10. The upper leg 14 and the lower leg 15 each comprise an installation flange angled away in the z direction. These flanges are oriented away from the profile chamber 12. A notch or an embossment reducing the flange height can be provided in the flange angled away from the lower leg 15, preferably in the region of the middle.

The reinforcing element assembly 13 comprises the reinforcing element 1.1 and a reinforcing profile 18. The reinforcing profile 18 comprises an essentially U-shaped transverse profiling. It is provided by an upper leg 19, a lower leg 20, and a web 21 connecting the two legs 19, 20. The reinforcing element 1.1 engages with its two legs 3.2, 3.3 in the chamber provided by the profiling of the reinforcing profile 18. The construction of the bumper crossbeam 9 and the arrangement of the reinforcing element assembly 13 inside the profile chamber 12 of the beam profile 10 can be seen from the sectional illustration of FIG. 6. In the beam profile 10 of the illustrated embodiment, the two legs 14, 15 are inclined tapering toward one another in the direction toward the web 16 at a small angle. As a result, the height of the profile chamber 12 increases from the region of the web 16 toward the opening of the profile chamber 12 facing away from the vehicle. The ends of the two legs 14, 15 facing away from the web 16 are angled facing away from the profile chamber 12 in the vertical direction (z direction) to form flanges 22, 22.1. The sides of the flanges 22, 22.1 facing away from the web 16 are used for attaching the closing plate 11, which is welded thereto.

The reinforcing element 1.1 is inserted into the chamber provided by the reinforcing profile 18 and is welded in the region of the upper and lower edge of its back 2.1 to the inner side of the upper and lower legs 19, 20. The weld seam is also embodied as a stitched seam in this design. The weld beads are identified by the reference signs 23, 23.1 in FIG. 6. The legs 3.2, 3.3 of the reinforcing element 1.1 do not extend up to the web 21 of the reinforcing profile 18. Rather, a spacing, which approximately corresponds to the height of the legs, remains between the ends 3.2, 3.3 facing toward the web 21. The back 2.1 of the reinforcing element 1.1 is arranged set back from the end, facing toward the closing plate 11, of the upper leg 19 and the lower leg 20 of the reinforcing profile 18. In the illustrated embodiment, this arrangement is performed against the background of the convex curvature of the front terminations of the upper leg 19 and the lower leg 20, while in contrast the reinforcing element 1.1 is embodied having its back linear.

Figure 6:
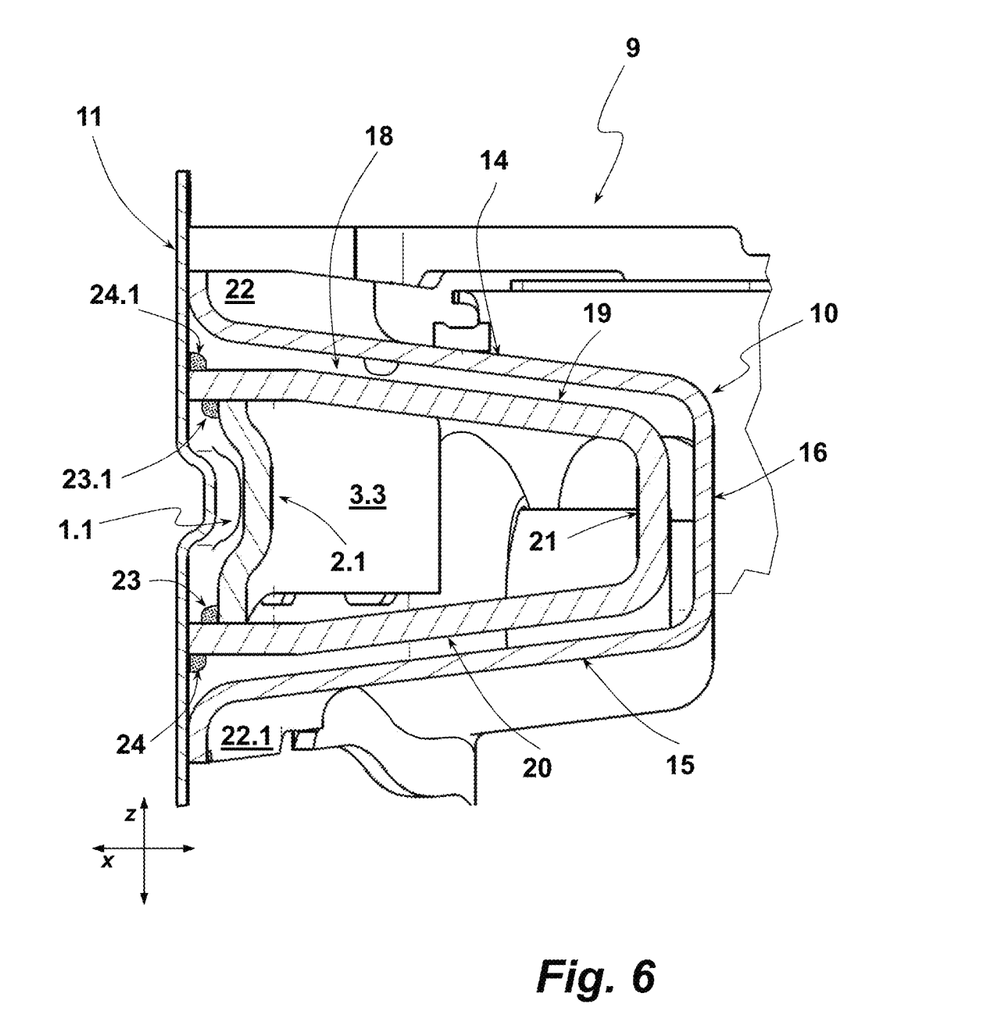
FIG. 6 shows a sectional view through the bumper crossbeam of FIG. 5 in the middle in the x-z plane.

The reinforcing element assembly 13 adjoins with the end faces of the legs 19, 20 of the reinforcing profile 18 on the inner side of the closing plate 11 and is connected thereto by a weld seam 24, 24.1, respectively. These weld seams can be embodied as continuous or also as a stitched seam.

It is clear from the cross-sectional illustration of FIG. 6 with respect to the bumper crossbeam 9 that the reinforcing profile 18 has no direct contact with its outer side with the beam profile 10. This profile is supported solely by the closing plate 11 in the illustrated embodiment. The profile chamber 12 is thus ventilated with its entire inner surface, which promotes the resistance to corrosion.

The bumper crossbeam 9 also meets particularly high requirements. In particular, it can absorb higher forces without the beam profile 10 tearing on its side facing toward the vehicle. The reason for this is the reinforcing provided by the reinforcing element assembly 13, which unfolds its full effect in the case of an impact, specifically when the reinforcing profile 18 acts with its outer side against the inner side of the beam profile 10. Moreover, crash structures acting in the x direction, by which impact energy can be dissipated by deformation, are provided by the legs 19, 20 of the reinforcing profile 18 and by the legs 3.2, 3.3 of the reinforcing element 1.1.

Figure 7:
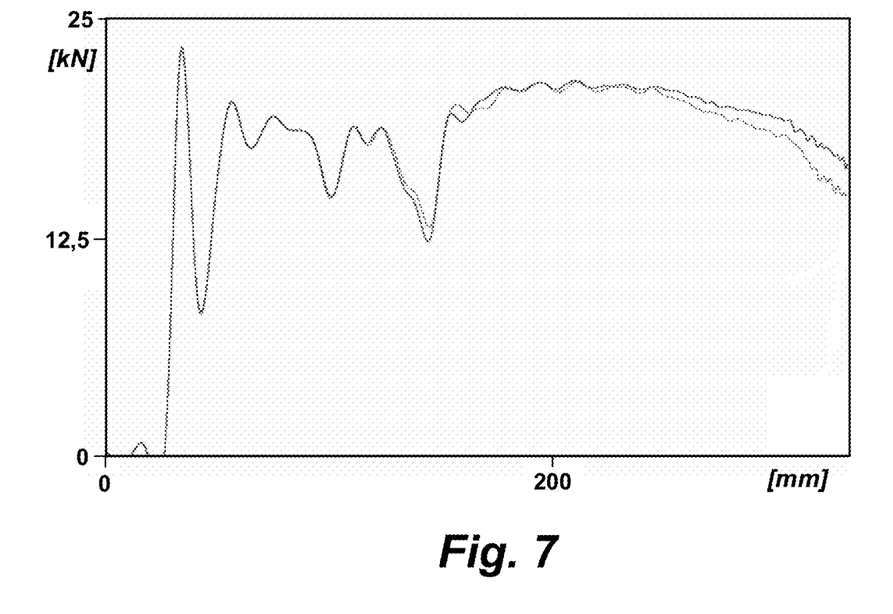
FIG. 7 shows a force-distance diagram to illustrate the deformation behavior of the bumper crossbeam of FIGS. 5 and 6.
Figure 8:
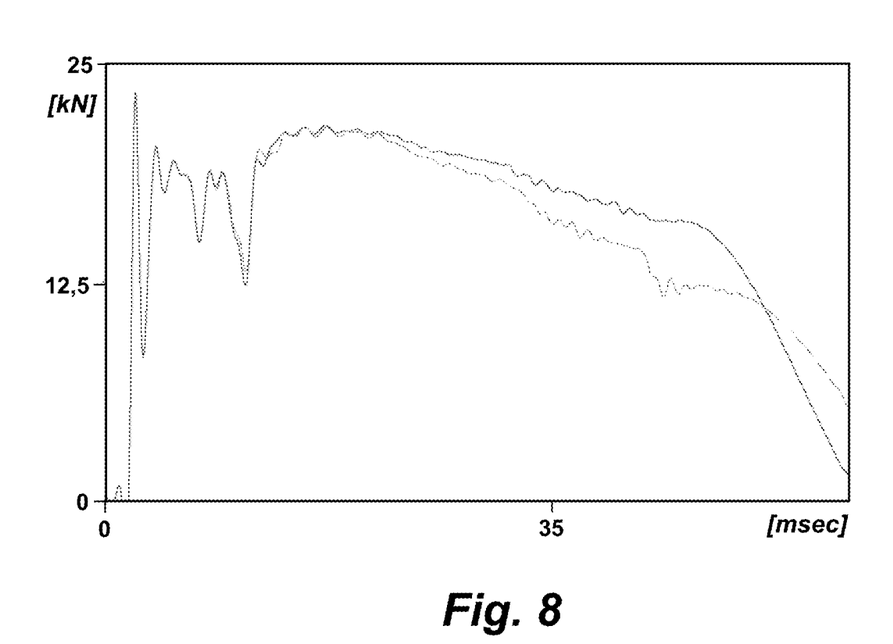
FIG. 8 shows a force-time diagram to illustrate the deformation behavior of the bumper crossbeam of FIGS. 5 and 6.

The force-distance diagram shown in FIG. 7, in which the behavior of the bumper crossbeam 9 is shown by a solid line and in comparison the same bumper crossbeam without a reinforcing element assembly integrated therein is shown by dashed lines, makes it clear that above a deformation of 200 mm, the bumper crossbeam 9 according to the present disclosure can absorb significantly more force. This is because of the above-described structuring and the installation of the reinforcing element assembly 13 in the beam profile 10. In the force-time diagram shown in FIG. 8, the difference from the crash behavior of the bumper crossbeam 9 in relation to one without a reinforcing element assembly, but with otherwise identical structure, is even clearer. The section before the force absorption curve drops is of interest in these curves. The improved properties of the bumper crossbeam 9 become clear in that significantly more force can be absorbed in the depicted time, before the curve drops steeply, than using a bumper crossbeam according to the prior art.

Figure 9:
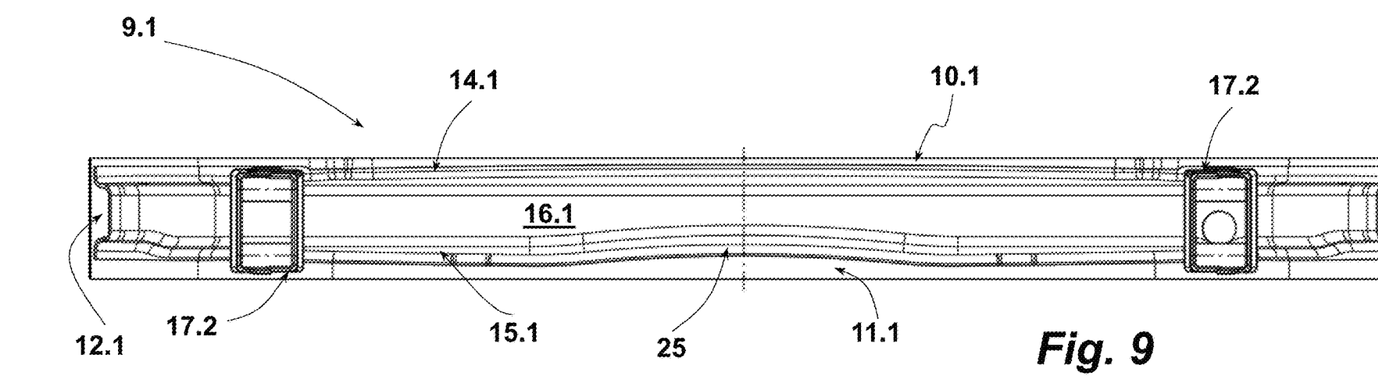
FIG. 9 shows a rear view of a bumper crossbeam according to a further design.

FIG. 9 shows a rear view of a further bumper crossbeam 9.1 with its beam profile 10.1 which is terminated on the front side by the closing plate 11.1. The profile chamber 12.1 can be seen in the region of the lateral sections bent toward the rear. The crash boxes are identified by the reference signs 17.2, 17.3. The bumper crossbeam 9.1 is basically constructed exactly like the bumper crossbeam 9. The bumper crossbeam 9.1 only differs therefrom in that its lower leg 15.1 forms a constriction with respect to the height of the profile chamber 12.1 in the middle region of the bumper crossbeam 9.1 in relation to its longitudinal extension. This is achieved by an embossment 25 introduced into the lower wall 15.1, in which the web 16.1 is also incorporated. The embossment 25 is embodied like a bulge oriented in the z direction into the profile chamber 12.1. This embossment is used as a buckle contact in case of crash, so that the bumper crossbeam 9.1 with its beam profile 10.1, in the event of a force action having a z component oriented upward, results in a defined deformation movement, specifically buckling in the region of the vertex of the embossment 25.

Figure 10:
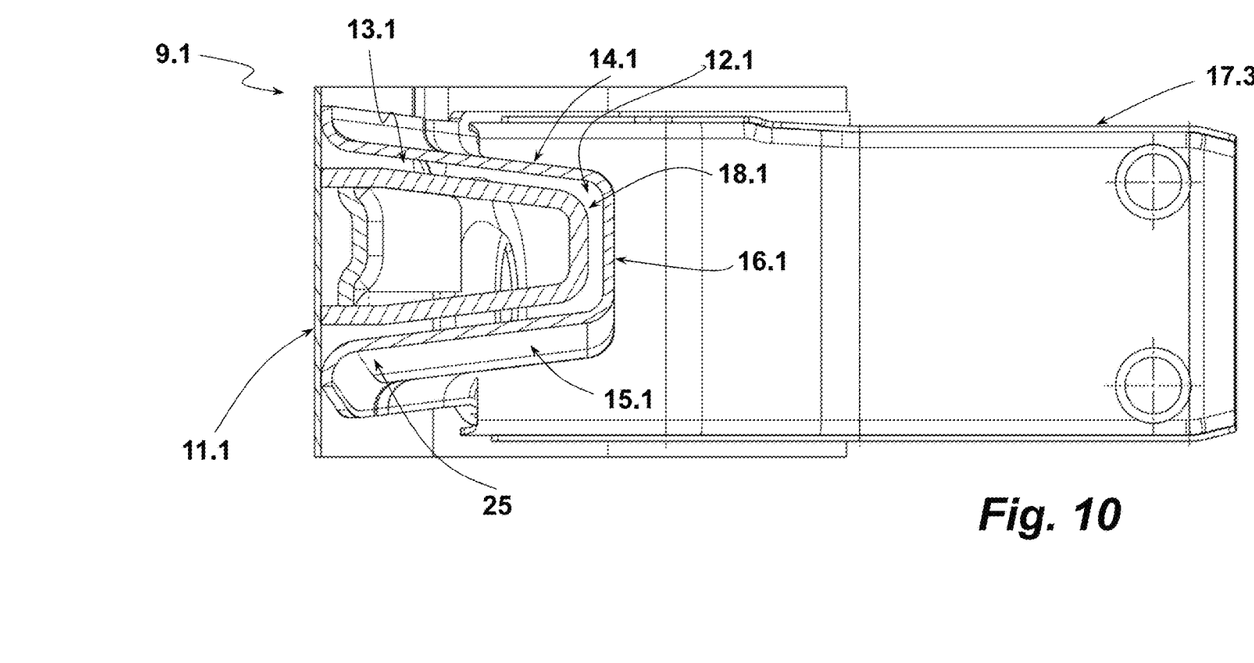
FIG. 10 shows a cross section to the bumper crossbeam of FIG. 9 in the region of its middle.

The cross section of FIG. 10 through the bumper crossbeam 9.1 of FIG. 9 shows that the reinforcing element assembly 13.1 plunging into the profile chamber 12.1 is constructed just like the reinforcing element assembly 13 as is described for the bumper crossbeam 9 of the preceding figures. The statements on the bumper crossbeam 9 and its reinforcing element assembly 13 thus apply similarly to the reinforcing element assembly 13.1 of the bumper crossbeam 9.1. The height of the reinforcing element 18.1 of the reinforcing element assembly 13.1 is uniform over its entire longitudinal extension, in contrast to the design of the beam profile 10.1. The height is adapted to the height reduction (constriction) of the profile chamber 12.1 formed by the embossment 25, specifically in such a way that, as seen in FIG. 10, the outer sides of the reinforcing profile 18.1 are arranged with spacing to the inner sides of the upper leg 14.1 and the lower leg 15.1.

If a force component, oriented upward in the z direction, occurs in the event of an impact, the beam profile 10.1 can buckle upward at a defined point, specifically in the region of the vertex of the embossment 25, which in turn results in tilting of the reinforcing element assembly 13.1 inside the profile chamber 12.1. The reinforcing element assembly 13.1 wedges with its reinforcing profile 18.1 against the legs 14.1, 15.1 enclosing the profile chamber 12.1. The buckling, the tilting of the reinforcing element assembly 13 in relation to the beam profile 10.1 and the working against one another thus effectuated of the beam profile 10.1 with the reinforcing profile 18.1 absorb impact energy to a noticeable extent. Therefore, the crash performance is improved once again with such a design.

The invention has been described on the basis of example embodiments. Without departing from the scope of the claims, numerous other possibilities exist for a person skilled in the art to be able to implement the invention, without these having to be specifically described in greater detail in the context of this description.

LIST OF REFERENCE NUMERALS

1, 1.1 reinforcing element
2, 2.1 back
3, 3.1, 3.2, 3.3 leg
4 beam profile
5 profile chamber
6 upper leg
7 lower leg
8 web
9, 9.1 bumper crossbeam
10, 10.1 beam profile
11, 11.1 closing plate
12, 12.1 profile chamber
13, 13.1 reinforcing element assembly
14, 14.1 upper leg
15, 15.1 lower leg
16, 16.1 web
17, 17.1, 17.2, 17.3 crash box
18, 18.1 reinforcing profile
19 upper leg
20 lower leg
21 web
22, 22.1 flange
23, 23.1 weld bead
24, 24.1 weld seam
25 embossment

The invention claimed is:

1. A bumper crossbeam comprising:
   a beam profile with a longitudinal extension which extends in its longitudinal axis in a vehicle transverse direction (y direction), wherein the beam profile comprises an upper leg, a lower leg, and a web connecting the legs and thus providing a profile chamber with a profile opening open in a travel direction (x direction);
   a closing plate which spans the profile opening in a vertical direction (z direction) and extends over at least a portion of the longitudinal extension of the beam profile, wherein the closing plate is attached to the upper and lower legs of the beam profile; and
   at least one reinforcing element installed in the profile chamber, wherein the reinforcing element comprises a long axis extending in the longitudinal extension of the beam profile and a short axis extending in the vertical direction, with the short axis being multiple times shorter than the long axis;

wherein an upper edge of the reinforcing element facing toward the profile opening is attached to the upper leg of the beam profile, and a lower edge of the reinforcing element facing toward the profile opening is attached to the lower leg of the beam profile;

wherein the reinforcing element comprises, on each of its ends facing in the profile longitudinal direction, a leg angled in the direction toward the web of the beam profile and ending with spacing to the web.

2. The bumper crossbeam of claim 1, wherein the bumper crossbeam comprises a single reinforcing element which is arranged in a middle region of the profile chamber in relation to the longitudinal extension of the beam profile.

3. The bumper crossbeam of claim 1, wherein the reinforcing element is structured in the vertical direction (z direction) with a beading following its longitudinal extension and extending over its entire longitudinal extension.

4. The bumper crossbeam of claim 1, wherein the angled legs of the reinforcing element are unstructured in the vertical direction (z direction).

5. A bumper crossbeam comprising:
a beam profile with a longitudinal extension which extends in its longitudinal axis in a vehicle transverse direction (y direction), wherein the beam profile comprises an upper leg, a lower leg, and a web connecting the legs and thus providing a profile chamber with a profile opening open in a travel direction (x direction);
a closing plate which spans the profile opening in a vertical direction (z direction) and extends over at least a portion of the longitudinal extension of the beam profile, wherein the closing plate is attached to the upper and lower legs of the beam profile; and
a reinforcing element assembly comprising a reinforcing element installed in the profile chamber, wherein the reinforcing element comprises a long axis extending in the longitudinal extension of the beam profile and a short axis extending in the vertical direction, with the short axis being multiple times shorter than the long axis;
wherein the reinforcing element assembly is attached to a side of the closing plate facing toward the profile opening and extends into the profile chamber of the beam profile;
wherein the reinforcing element comprises, on each of its ends facing in the profile longitudinal direction, a leg angled in the direction toward the web of the beam profile and ending with spacing to the web.

6. The bumper crossbeam of claim 5, wherein the reinforcing element assembly includes, in addition to the reinforcing element, a reinforcing profile comprising an upper leg, a lower leg and a web connecting the legs and thus providing a chamber, wherein the reinforcing element is inserted in a middle region of the chamber of the reinforcing profile in relation to a longitudinal extension of the reinforcing profile and is attached to the upper and lower legs of the reinforcing profile.

7. The bumper crossbeam of claim 6, wherein the upper and the lower legs of the reinforcing profile are convexly curved following a frontal curvature of the beam profile in the direction toward the profile opening of the beam profile in the x-y plane.

8. The bumper crossbeam of claim 7, wherein the reinforcing element is embodied as linear in the direction of its longitudinal extension and is arranged set back from the convexly curved terminus of the upper and lower legs of the reinforcing profile in the chamber provided by the reinforcing profile.

9. The bumper crossbeam of claim 8, wherein the cross-sectional profile of the reinforcing profile substantially corresponds to the cross-sectional profile of the beam profile.

10. The bumper crossbeam of claim 9, wherein the height of the profile chamber provided by the beam profile is reduced in a middle section in relation to the longitudinal extension of the beam profile by an embossment introduced into the lower leg of the beam profile.

11. The bumper crossbeam of claim 10, wherein the embossment is embodied as a bulge oriented into the profile chamber of the beam profile in a middle region of the bumper crossbeam.

12. The bumper crossbeam of claim 6, wherein the height of the profile chamber provided by the beam profile is reduced in a middle section in relation to the longitudinal extension of the beam profile by an embossment introduced into the lower leg of the beam profile.

13. The bumper crossbeam of claim 12, wherein the embossment is embodied as a bulge oriented into the profile chamber of the beam profile in a middle region of the bumper crossbeam.

14. The bumper crossbeam of claim 7, wherein the height of the profile chamber provided by the beam profile is reduced in a middle section in relation to the longitudinal extension of the beam profile by an embossment introduced into the lower leg of the beam profile.

15. The bumper crossbeam of claim 14, wherein the embossment is embodied as a bulge oriented into the profile chamber of the beam profile in a middle region of the bumper crossbeam.

16. The bumper crossbeam of claim 8, wherein the height of the profile chamber provided by the beam profile is reduced in a middle section in relation to the longitudinal extension of the beam profile by an embossment introduced into the lower leg of the beam profile.

17. The bumper crossbeam of claim 16, wherein the embossment is embodied as a bulge oriented into the profile chamber of the beam profile in a middle region of the bumper crossbeam.

18. The bumper crossbeam of claim 5, wherein the bumper crossbeam comprises a single reinforcing element which is arranged in a middle region of the profile chamber in relation to the longitudinal extension of the beam profile.

* * * * *